United States Patent
Huang et al.

(10) Patent No.: US 9,066,268 B2
(45) Date of Patent: Jun. 23, 2015

(54) METHOD AND SYSTEM FOR CONTROLLING NETWORK ACCESS DURING HNB HANDOVER

(75) Inventors: Yada Huang, Shenzhen (CN); Zhongda Du, Shenzhen (CN)

(73) Assignee: ZTE Corporation, Guangdong (CN)

( * ) Notice: Subject to any disclaimer, the term of this patent is extended or adjusted under 35 U.S.C. 154(b) by 257 days.

(21) Appl. No.: 13/145,737

(22) PCT Filed: Jan. 21, 2010

(86) PCT No.: PCT/CN2010/070314
§ 371 (c)(1),
(2), (4) Date: Jul. 21, 2011

(87) PCT Pub. No.: WO2010/083767
PCT Pub. Date: Jul. 29, 2010

(65) Prior Publication Data
US 2011/0280218 A1    Nov. 17, 2011

(30) Foreign Application Priority Data
Jan. 22, 2009    (CN) .......................... 2009 1 0077543

(51) Int. Cl.
*G01R 31/08* (2006.01)
*H04B 7/00* (2006.01)
(Continued)

(52) U.S. Cl.
CPC ............ *H04W 36/0055* (2013.01); *H04W 4/08* (2013.01); *H04W 12/08* (2013.01); *H04W 84/045* (2013.01)

(58) Field of Classification Search
CPC .............. H04W 80/011; H04W 36/18; H04W 36/0011; H04W 36/55; H04W 12/08; H04W 84/045

USPC ........................................................ 370/331
See application file for complete search history.

(56) References Cited

U.S. PATENT DOCUMENTS

| 7,151,773 | B1 * | 12/2006 | Mo et al. ........................ 370/392 |
| 7,280,505 | B2 * | 10/2007 | Chaskar et al. ............... 370/331 |
| 2008/0132239 | A1 | 6/2008 | Khetawat |
| 2008/0305801 | A1 | 12/2008 | Burgess et al. |

(Continued)

FOREIGN PATENT DOCUMENTS

| CN | 101136826 A | 3/2008 |
| CN | 101321383 | 12/2008 |

(Continued)

OTHER PUBLICATIONS

International Search Report in international application No. PCT/CN2010/070314, mailed on Apr. 29, 2010.

(Continued)

*Primary Examiner* — Brian Roberts
*Assistant Examiner* — Abu-Sayeed Haque
(74) *Attorney, Agent, or Firm* — Schiff Hardin LLP

(57) ABSTRACT

The present invention discloses a method and a system for controlling network access during HNB handover. The method comprises the following steps: a core network acquires target HNB information to determine whether to allow access of User Equipment (UE) and sends the target HNB information to an HNB GW to which the target HNB belongs if the access of the UE is allowed and the target HNB is connected with the core network via the HNB GW, and the HNB GW determines whether to allow the access of the UE according to the received target HNB information. The present invention can prevent the occurrence of illegal accesses and improve the security of network access.

9 Claims, 2 Drawing Sheets

(51) Int. Cl.
  *H04L 12/28* (2006.01)
  *H04W 36/00* (2009.01)
  *H04W 12/08* (2009.01)
  *H04W 4/08* (2009.01)
  *H04W 84/04* (2009.01)

(56) References Cited

U.S. PATENT DOCUMENTS

| | | | |
|---|---|---|---|
| 2010/0062779 A1* | 3/2010 | Bienas et al. | 455/446 |
| 2010/0069119 A1* | 3/2010 | Mueck et al. | 455/561 |
| 2010/0254474 A1* | 10/2010 | Gomadam et al. | 375/267 |
| 2010/0317386 A1* | 12/2010 | Da Silva et al. | 455/507 |
| 2010/0323700 A1* | 12/2010 | Bachmann et al. | 455/436 |
| 2011/0243097 A1* | 10/2011 | Lindqvist et al. | 370/331 |
| 2011/0281584 A1* | 11/2011 | Sander et al. | 455/436 |

FOREIGN PATENT DOCUMENTS

| | | |
|---|---|---|
| CN | 101335984 A | 12/2008 |
| CN | 101605367 A | 12/2009 |
| EP | 2154902 A1 | 2/2010 |
| JP | 2007-329542 | 12/2007 |
| JP | 2010-506536 | 2/2010 |
| JP | 2010-531124 | 9/2010 |
| KR | 20090052898 | 5/2009 |
| WO | 2008001113 | 1/2008 |
| WO | 2008045438 | 4/2008 |
| WO | 2008055251 A2 | 5/2008 |
| WO | 2008136416 | 11/2008 |
| WO | 2008157817 | 12/2008 |
| WO | 2009151258 A2 | 12/2009 |
| WO | 2010036011 | 4/2010 |
| WO | 2010036181 | 4/2010 |

OTHER PUBLICATIONS

English Translation of the Written Opinion of the International Search Authority in international application No. PCT/CN2010/070314, mailed on Apr. 29, 2010.

* cited by examiner

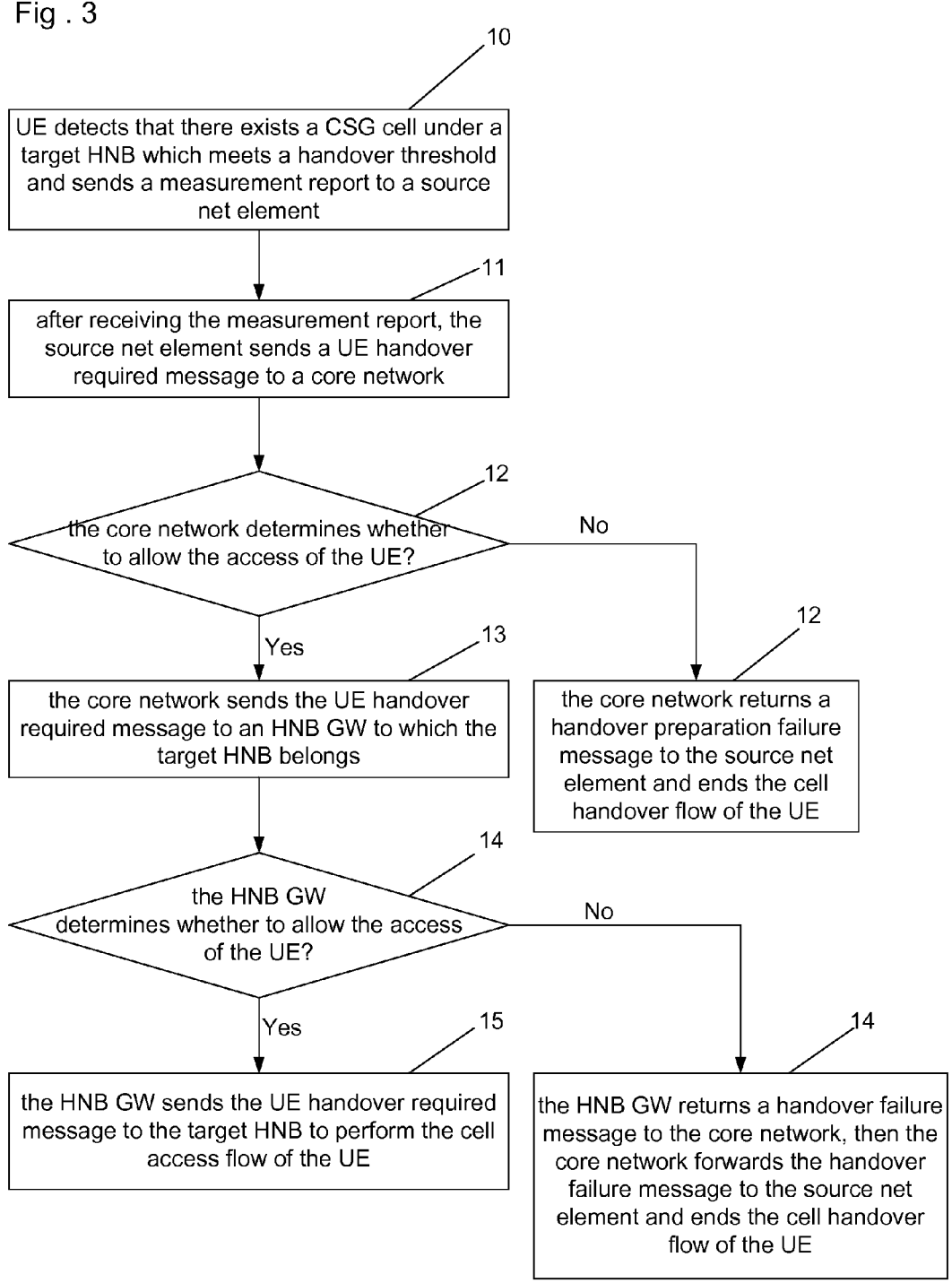

METHOD AND SYSTEM FOR CONTROLLING NETWORK ACCESS DURING HNB HANDOVER

TECHNICAL FIELD

The present invention relates to the field of a network access control technology, and particularly to a method and a system for controlling network access during Home Node B (HNB) handover.

BACKGROUND

An HNB is a small-sized and low-power base station, which is set in home, offices and other indoor places to provide users with higher service rate, reducing the cost on using high-rate service, and making up for the disadvantages in the coverage of the existed distributed cellular radio communication system. The advantages of the HNB are economical, convenience, low power output, plug-and-play and so on.

FIG. 1 is a schematic diagram illustrating the network topology of an HNB. As shown in FIG. 1, an HNB Access Network (HNB AN) consists of HNBs and an HNB Gateway (HNB GW), the HNBs are connected to a core network via the HNB AN. The main functions of the HNB GW are to validate the security of the HNBs, to process the registration and the access control of the HNBs, to perform Operation Administration and Maintenance on the HNBs, to configure and control the HNBs according to the requirements of the operators, and to exchange data between the core network and the HNBs, and so on.

The HNB further comprises Home Evolution Node B (HeNB), which can be directly connected to the core network without using the HNB GW.

As the resource dedicated to private subscribers, the HNB may be set in home, a group, a company, a school and other private places, several cells covered by an HNB form an HNB coverage area, and an HNB is only accessible to authorized HNB subscribers, such as family members or group members and the like. The cell of a common base station, that is, a Node B (NB) or an Evolution Node B (eNB), provides services for all subscribers; while the cell covered by an HNB only provides services for the authorized subscribers, so the cell covered by an HNB is referred to as a Closed Subscriber Group (CSG) cell.

According to the access mode the HNBs are divided into three types: a close authorization mode, in which the CSG cell covered by an HNB is only accessible to the authorized CSG User Equipment (CSG UE) but not to unauthorized UE; a hybrid authorization mode, in which the CSG cell covered by an HNB is also accessible to the unauthorized UE which has limited use authority; and an open authorization mode, in which the CSG cell covered by an HNB is accessible to all of the UE. A CSG ID list of an HNB to which a UE-accessible CSG cell belongs is known as a White List, which is stored in the user database of a core network. When UE desires to access a CSG cell, the source net element, which is an NB or an HNB herein, reports the CSG ID of the CSG cell to a core network, then the core network determines whether the White List of the UE contains the CSG ID, if so, allows the access of the UE, otherwise, rejects the access-request of the UE, such an access control is referred to as CSG-based access control.

In the prior art, there is two ways for UE accessing a cell: one is directly accessing a target cell, the other is handing over to the target cell from another cell by a handover mode. FIG. 2 is a schematic diagram illustrating the flow of a cell handover of UE at a network side in the prior art. As shown in FIG. 2, a source net element initiates the cell handover of the UE, and sends a UE handover (relocation) required message to a core network. After receiving the message, the core network determines the position of the target HNB according to the target HNB information contained in the UE handover required message, and then sends the handover (relocation) required message to the target HNB. The target HNB reads the information in the UE handover required message, determines whether to allow the access of the UE, and then returns a UE handover required success/failure response message to the core network. After receiving the success response message, the core network sends a handover command to the source net element, and then the subsequent cell access flow of the UE is continued between the net elements and the handover process of the UE is started at air interfaces. An HNB GW exists between the core network and the HNB, which only plays a role in routing and forwarding in this process.

It can be seen from the above flow that the UE can also access a cell through a handover process. As required by a CSG cell, the core network performs access control before the UE enters the CSG cell to function, and rejects the handover process if the CSG cell is not listed in the White List of the UE. However, when an HNB is connected with a core network via an HNB GW, the core network takes the HNB GW as a big Radio Network Controller (RNC) or a base station. As the HNB GW may manage lots of HNBs, for the core network, an HNB is an RNC or a base station supporting multiple CSGs. The core network only has the authorization information corresponding to the HNB GW but no information of the HNB or related authorization such as the one-to-one correspondence relationship between a CSG ID and an authorization mode. When UE requires a handover to an HNB under the HNB GW, the core network performs access control according to the CSG ID and the authorization mode reported by the UE. As the core network has no one-to-one correspondence relationship between the HNB and the authorization information, the UE can fraudulently report a CSG ID in its own White List as long as the CSG ID belongs to an HNB under the HNB GW, or fraudulently report the access mode of the CSG cell to be a hybrid mode or an open mode. Through such means, the UE can fraudulently pass CSG access control at the core network side to access a CSG cell that is actually unauthorized to the UE. The reason for such security problems lies in that when an HNB is connected with the core network via an HNB GW, the core network takes the HNB GW as a big HNB and has no specific authorization information corresponding to each HNB. As a consequence, the core network performs access control on an HNB under the HNB GW only depending on the information reported by the UE, and the aforementioned potential safety hazards occur if the UE report dishonestly.

SUMMARY

In view of this, the main object of the present invention is to provide a method and a system for controlling network access during HNB handover which are capable of improving the security of the network access.

In order to achieve the purpose above, the technical solution of the present invention is realized as follows:

The present invention provides a method for controlling network access during HNB handover, which comprises:

a core network acquires target HNB information to determine whether to allow access of UE and sends the target HNB information to an HNB GW to which the target HNB belongs if the access of the UE is allowed and the target HNB is connected with the core network via the HNB GW; and the HNB GW determines whether to allow the access of the UE according to the received target HNB information.

The target HNB information may include an identifier of a CSG cell under the target HNB, a CSG ID of the target HNB and/or access mode information of the target HNB.

In the technical solution, before the core network acquires the target HNB information to determine whether to allow the access of the UE, the method may further comprise: the core network stores a White List of the UE.

The step that the core network determines whether to allow the access of the UE may comprise: the core network determines whether the CSG ID of the target HNB exists in the White List of the UE, if so, determines the access of the UE is allowed, otherwise, determines the access of the UE is rejected.

In the technical solution, before the HNB GW determines whether to allow the access of the UE according to the received target HNB information, the method may further comprise: the HNB GW stores, by itself, access control information of an HNB, the access control information includes at least one of: access mode information of the HNB, an identifier of a CSG cell under the HNB and a corresponding CSG ID.

The step that the HNB GW determines whether to allow the access of the UE according to the received target HNB information may comprises: the HNB GW matches the received target HNB information with the access control information of the HNB stored by the HNB GW itself, determines the access of the UE is allowed if the match is successful, otherwise, determines the access of the UE is rejected.

The target HNB information may be sent to the core network by a source net element via a UE handover required message, the source net element may include one of: a common base station, an HNB, an HNB GW or an RNC; and the source net element may inform the core network of the target HNB information according to a measurement report reported by the UE.

After the HNB GW determines to allow the access of the UE according to the received target HNB information, the HNB GW may send a UE handover required message to the target HNB to perform a cell access flow of the UE.

The target HNB information may comprise at least one of: an identifier of a CSG cell under the target HNB, a CSG ID of the target HNB and access mode information of the target HNB.

The identifier of the CSG cell may include one of: a cell identifier and a global cell identifier.

The present invention further provides a system for controlling network access during HNB handover, which comprises a core network and an HNB GW, wherein the core network is used for acquiring target HNB information to determine whether to allow access of UE, and sending the target HNB information to the HNB GW to which the target HNB belongs if the access of the UE is allowed and the target HNB is connected with the core network via the HNB GW;

the HNB GW is used for determining whether to allow the access of the UE according to the received target HNB information;

wherein the target HNB information comprises one of: an identifier of a CSG cell under the target HNB, a CSG ID of the target HNB, and access mode information of the target HNB.

The HNB GW further may comprise: a storage unit for storing access control information of an HNB, the access control information may include access mode information of the HNB, an identifier of a CSG cell under the HNB and a corresponding CSG ID; and a determination unit for matching the target HNB information with the access control information of the HNB stored by the storage unit and determining whether to allow the access of the UE according to a result of the match.

The system for controlling network access during HNB handover may further comprise: a source net element for sending a UE handover required message which contains the target HNB information to the core network and further sending the UE handover required message to the core network according to a CSG cell handover measurement report of the UE. The source net element may be a common base station, an HNB, an HNB GW or an RNC.

In the technical solution, the identifier of the CSG cell is a cell identifier or a global cell identifier.

According to the method and the system for controlling network access during HNB handover in the present invention, by adding UE access control at the HNB GW, the core network and the HNB GW accomplish together the access control of a CSG cell when the UE is handed over to an HNB cell, and the HNG GW checks the access control information reported by the UE to the core network. The method and the system can prevent the occurrence of illegal access events and therefore improve the security of network access.

BRIEF DESCRIPTION OF THE DRAWINGS

FIG. 3 is a schematic diagram illustrating the flow of the method for controlling network access during HNB handover disclosed in the present invention.

DETAILED DESCRIPTION

Figure 1:
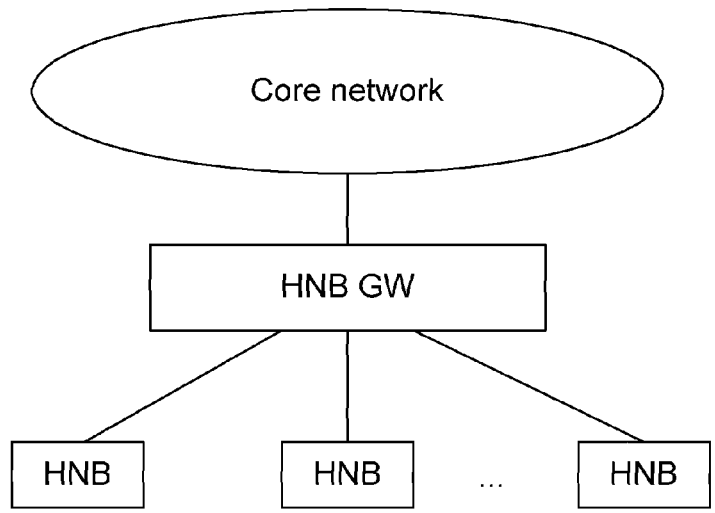
FIG. 1 is a schematic diagram illustrating the network topology of an HNB.
Figure 2:
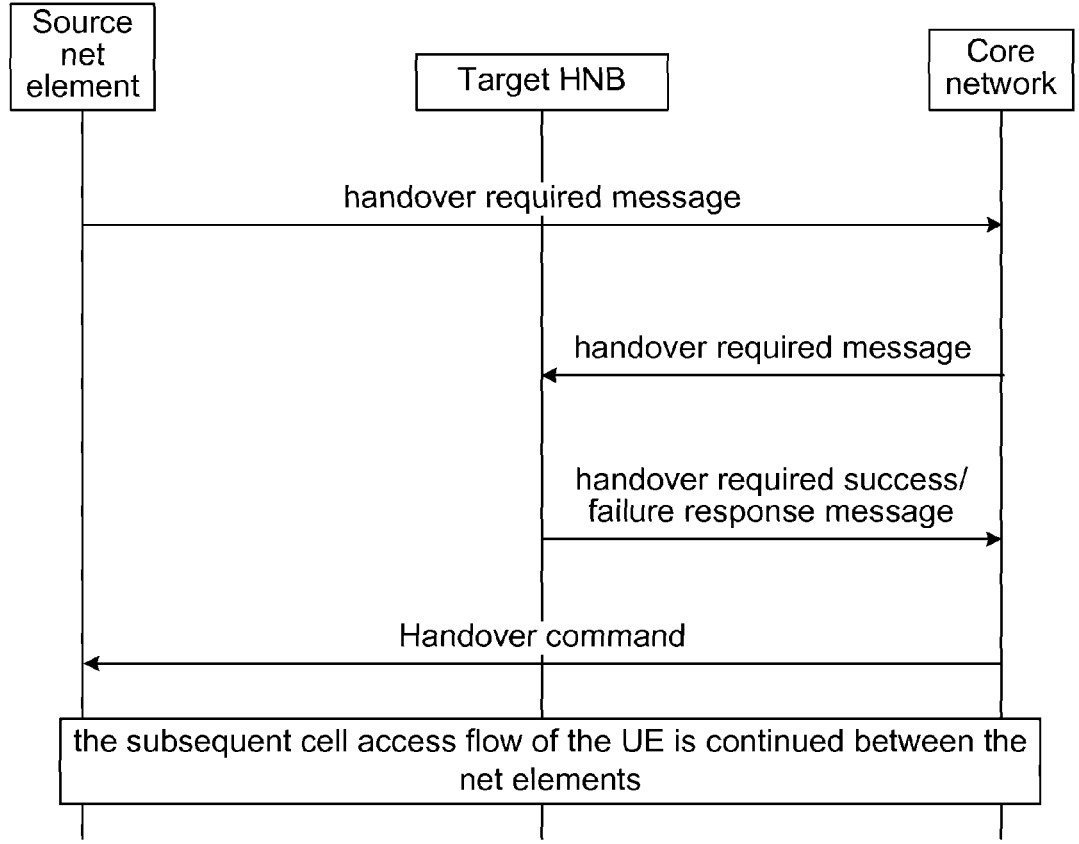
FIG. 2 is a schematic diagram illustrating the flow of a cell handover of UE at a network side in the prior art.

The basic idea of the present invention is that UE access control is added at an HNB GW. Besides controlling the UE access by the core network, the HNB GW matches the target HNB access control information received from the core network with the HNB access control information stored by the HNB GW itself, and the access of the UE is further controlled according to the result of the match so as to improve the security of network access.

The present invention provides a system for controlling network access during HNB handover, which comprises a source net element, a core network, an HNB GW and an HNB, specifically, the source net element is used for sending a UE handover required message to the core network;

the core network is used for determining whether to allow the access of the UE according to the received UE handover required message; if the access of the UE is allowed and a target HNB is connected with the core network via the HNB GW, the core network sends the UE handover required message to the HNB GW to which the target HNB belongs; if the access of the UE is not allowed, the core network returns a handover preparation failure message to the source net element;

the HNB GW is used for determining whether to allow the access of the UE; if the access of the UE is allowed, the HNB GW sends the UE handover required message to the target HNB to perform the cell access flow of the UE; if the access of the UE is not allowed, the HNB GW returns a handover failure message to the core network, then the core network forwards the handover failure message to the source net element;

the HNB is used for performing the cell access flow of the UE according to the UE handover required message sent by the HNB GW.

The UE handover required message contains the target HNB information which further includes the identifier of a CSG cell under the target HNB, the CSG ID of the target HNB and/or the access mode information of the target HNB.

The HNB GW further comprises:

a storage unit for storing the access control information of an HNB, the access control information includes the access mode information of the HNB, the identifier of a CSG cell under the HNB and the corresponding CSG ID and the like; and a determination unit for matching the target HNB information in the UE handover required message with the access control information stored by the HNB GW itself and determining whether to allow the access of the UE according to the result of the match.

The source net element, which may be a common base station, an HNB, an HNB GW or RNC and the like, sends the UE handover required message to the core network according to a CSG cell handover measurement report of the UE. The measurement report contains the target HNB information which further includes the identifier of a CSG cell under the target HNB, the CSG ID and/or the access mode information of the target HNB.

The core network stores the White List of the UE, determines whether the CSG ID of the target HNB exists in the White List of the UE, if so, determines the access of the UE is allowed, otherwise, determines the access of the UE is rejected.

The HNB GW matches the identifier of the CSG cell, the CSG ID and/or the access mode information of the target HNB contained in the target HNB information with the access control information stored by the HNB GW itself, determines the access of the UE is allowed if the match is successful, otherwise, determines the access of the UE is rejected; a successful match refers to the accordance of the identifier of the CSG cell, the CSG ID and the access mode information contained in the target HNB information with those stored in the HNB GW.

The identifier of the CSG cell may be a cell ID or a global cell ID depending on the running condition.

FIG. 3 is a schematic diagram illustrating the flow of the method for controlling network access during HNB handover disclosed in the present invention. As shown in FIG. 3, the method for controlling network access comprises the following steps:

10: UE detects that there exists a CSG cell under a target HNB which meets a handover threshold and sends a measurement report to a source net element.

The measurement report contains the target HNB information which includes the identifier of the CSG cell under the target HNB, the CSG ID of the target HNB and/or the access mode information of the HNB.

11: after receiving the measurement report, the source net element sends a UE handover required message to a core network.

The source net element may be a common base station, an HNB, an HNB GW or a RNC and the like.

The UE handover required message contains the target HNB information which further includes the identifier of the CSG cell under the target HNB, the CSG ID and/or the access mode information of the target HNB.

12: the core network determines whether to allow the access of the UE, if so, Step 13 is executed, otherwise, returns a handover preparation failure message to the source net element and ends the cell handover flow of the UE.

In this step, the White List of the UE is stored in the user database of the core network, the core network determines whether the CSG ID of the target HNB exists in the White List of the UE, if so, determines the access of the UE is allowed, otherwise, determines the access of the UE is rejected.

13: the core network sends the UE handover required message to an HNB GW to which the target HNB belongs.

The UE handover required message contains the target HNB information which further includes the identifier of the CSG cell under the target HNB, the CSG ID and/or the access mode information of the target HNB.

14: the HNB GW determines whether to allow the access of the UE, if so, Step 15 is executed, otherwise, returns a handover failure message to the core network, then the core network forwards the handover failure message to the source net element and ends the cell handover flow of the UE.

In this step, the HNB GW stores, by itself, the access control information of an HNB which includes the access mode information of the HNB, the identifier of a CSG cell under the HNB and a corresponding CSG ID; the HNB GW matches the identifier of the CSG cell under the target HNB, the CSG ID and other information contained in the UE handover required message with those stored by itself, the access of the UE is allowed if the match is successful, otherwise, the access of the UE is rejected.

15: the HNB GW sends the UE handover required message to the target HNB to perform the cell access flow of the UE.

In this step, the cell access flow of the UE is prior art, so no more repeated description is given here.

The method for controlling network access during HNB handover is further described in detail by reference to the specific embodiments.

Embodiment 0

This embodiment is based on an example of the Universal Mobile Telecommunication System (UMTS) in which the source net element is an RNC, the UE resides in a macro cell M1, and the CSG cell which the UE desires to access is H1.

In this UMTS, after measuring that the CSG cell H1 meets a handover threshold, the UE sends a measurement report to a base station which then forwards the measurement report to a serving RNC. The measurement report contains the cell ID of the CSG cell H1 and the CSG ID of the target HNB to which the cell H1 belongs. After receiving the measurement report, the RNC determines to initiate a handover to the HNB and sends a UE handover required message to a core network. The UE handover required message contains the cell ID of the CSG cell H1 and the CSG ID of the target HNB to which the cell H1 belongs. After receiving the UE handover required, the core network searches the corresponding White List of the UE stored at the core network side for the CSG ID contained in the UE handover required message. The core network determines the access control is passed if the CSG ID is found, otherwise, returns a handover preparation failure message to the RNC. After the access control is passed, the core network sends the UE handover required message to the HNB GW to which the target cell H1 belongs, wherein the UE handover required message contains the cell ID of the CSG cell H1 and the CSG ID of the target HNB to which the cell H1 belongs. After receiving the UE handover required, the HNB GW performs access control on the UE, matches the cell ID of the CSG cell H1 and the CSG ID contained in the UE handover required message with those stored by the HNB GW itself, and rejects the access and returns a handover failure message to the core network if the match is failed, then the core network forwards the handover failure message to the RNC and ends the handover flow. If the match is successful, the HNB GW allows the access and sends the UE handover required message to the HNB to perform the cell access flow of the UE.

Embodiment II

This embodiment is based on an example of a Long Term Evolution (LTE) system in which the source net element is an eNB, the UE resides in a macro cell M1, and the target cell which the UE desires to access is H1.

In this LTE system, after measuring that the CSG cell H1 meets a handover threshold, the UE sends a measurement report to a serving eNB, wherein the measurement report contains the cell ID of the target cell H1 and the CSG ID of the target HNB to which the cell H1 belongs. After receiving the measurement report, the eNB determines to initiate handover to the HNB and sends a UE handover required message to a core network. The UE handover required message contains the cell ID of the target cell H1 and the CSG ID of the target HNB to which the cell H1 belongs. After receiving the UE handover required message, the core network searches the corresponding White List of the UE stored at the core network side for the CSG ID contained in the UE handover required message. The core network determines the access control is passed if the CSG ID is found, otherwise, returns a handover preparation failure message to the source eNB. After the access control is passed, the core network sends the UE handover required message to the HNB GW to which the target HNB belongs, wherein the UE handover required message contains the cell ID of the CSG cell H1 and the CSG ID of the target HNB to which the cell H1 belongs. After receiving the UE handover required message, the HNB GW performs access control on the UE, matches the cell ID of the CSG cell H1 and the CSG ID contained in the UE handover required message with those stored by the HNB GW itself, and rejects the access and returns a handover failure message to the core network if the match is failed, then the core network forwards the handover failure message to the eNB and ends the handover flow. If the match is successful, the HNB GW allows the access and sends the UE handover required message to the HNB to perform the cell access flow of the UE.

Embodiment III

This embodiment is based on an example of an LTE system in which the source net element is a HeNB, the UE resides in a CSG cell H1, and the target cell which the UE desires to access is H2.

In this LTE system, the HeNB where the CSG cell H1 resides is directly connected with the core network. After measuring that the CSG cell H2 meets a handover threshold, the UE sends a measurement report to the serving HeNB where the H1 resides, wherein the measurement report contains the cell ID of the CSG cell H2 and the CSG ID of the target HNB to which the cell H2 belongs. After receiving the measurement report, the HeNB determines to initiate handover to the HNB and sends a UE handover required message to the core network. The UE handover required message contains the cell ID of the CSG cell H2 and the CSG ID of the target HNB to which the cell H2 belongs. After receiving the UE handover required message, the core network searches the corresponding White List of the UE stored at the core network side for the CSG ID contained in the UE handover required message. The core network determines the access control is passed if the CSG ID is found, otherwise, returns a handover preparation failure message to the source HeNB. After the access control is passed, the core network sends the UE handover required message to the HNB GW to which the target HNB belongs, wherein the UE handover required message contains the cell ID of the CSG cell H2 and the CSG ID of the target HNB to which the cell H2 belongs. After receiving the UE handover required message, the HNB GW performs an access control on the UE, matches the cell ID of the CSG cell H2 and the CSG ID contained in the UE Handover Required with those stored by the HNB GW itself, and rejects the access and returns a handover failure message to the core network if the match is failed, then the core network forwards the handover failure message to the HeNB and ends the handover flow. If the match is successful, the HNB GW allows the access of the UE and sends the UE handover required message to the HNB to perform the cell access flow of the UE.

Embodiment IV

This embodiment is based on an example of an LTE system in which the source net element is an eNB, the UE resides in a macro cell M1, and the CSG cell which the UE desires to access is H1, which is a hybrid cell.

In this LTE system, after measuring that the CSG cell H1 meets a handover threshold and the CSG cell H1 is a hybrid cell, the UE sends a measurement report to a serving eNB, wherein the measurement report contains the cell ID of the CSG cell H1, the CSG ID of the target HNB to which the cell H1 belongs, and hybrid mode information. After receiving the measurement report, the eNB determines to initiate handover to the HNB and sends a UE handover required message to a core network. The UE handover required message contains the cell ID of the CSG cell H1, the CSG ID of the target HNB to which the cell H1 belongs, and the hybrid mode information of the cell. After receiving the UE handover required message, the core network searches the corresponding White List of the UE stored at the core network side for the CSG ID contained in the UE handover required message. The core network determines the access control is passed if the CSG ID is found, otherwise, allows the access of the UE as the CSG cell is a hybrid cell which allows the access of a non-CSG member. After the access control is passed, the core network sends the UE handover required message to the HNB GW to which the target HNB belongs to, wherein the UE handover required message contains the cell ID of the CSG cell H1, the CSG ID of the target HNB to which the cell H1 belongs, and the hybrid mode information. After receiving the UE handover required message, the HNB GW performs access control on the UE, matches the cell ID of the CSG cell H1, the CSG ID and the hybrid mode information contained in the UE handover required message with those stored by the HNB GW itself, and rejects the access and returns a handover failure message to the core network if the match is failed, then the core network forwards the handover failure message to the eNB and ends the handover flow. If the match is successful, the HNB GW allows the access of the UE and sends the UE handover required message to the HNB to perform the cell access flow of the UE.

Embodiment V

This embodiment is based on an example of an LTE system in which the source net element is an eNB, the UE resides in a macro cell M1, and the CSG cell which the UE desires to access is H1, which is an open cell.

In this LTE system, after measuring that the CSG cell H1 meets a handover threshold and the CSG cell H1 is an open cell, the UE sends a measurement report to a serving eNB, wherein the measurement report contains the cell ID and the open mode information of the CSG cell H1. After receiving the measurement report, the eNB determines to initiate handover to the HNB and sends a UE handover required message to the core network. The UE handover required message contains the cell ID and the open mode information of the CSG cell H1. After receiving the UE handover required message, the core network determines the access control is passed if it finds that the CSG cell H1 is an open cell, and sends the UE handover required message to the HNB GW to which the target HNB belongs, wherein the UE handover required message contains the cell ID and the open mode information of the CSG cell H1. After receiving the UE handover required, the HNB GW performs access control on the UE, matches the cell ID and the open mode information of the CSG cell H1 contained in the UE handover required message with those stored by the HNB GW itself, and rejects the access and returns a handover failure message to the core network if the match is failed, then the core network forwards the handover failure message to the eNB and ends the handover flow. If the match is successful, the HNB GW allows the access of the UE and sends the UE handover required message to the HNB to perform the cell access flow of the UE.

In conclusion, the scheme of the present invention is to define a method and a system for controlling access during HNB handover in an HNB scene. The scheme enables a terminal user to move rationally and legally in an available HNB scene through handover.

The mentioned above are only preferred embodiments of the present invention but not limitation to the protection scope of the present invention.

What is claimed is:

1. A method for controlling network access during Home Node B (HNB) handover in a Long Term Evolution (LTE) system, comprising:
   acquiring target HNB information by a core network to determine whether to allow access of User Equipment (UE), wherein the target HNB information comprises at least one of: an identifier of a Closed Subscriber Group (CSG) cell under the target HNB, a Closed Subscriber Group Identification (CSG ID) of the target HNB, and access mode information of the target HNB;
   sending the target HNB information by the core network to an HNB Gateway (GW) to which the target HNB belongs when the access of the UE is allowed and the target HNB is connected with the core network via the HNB GW;
   storing access control information of an HNB by the HNB GW, wherein the access control information includes at least one of: access mode information of the HNB, an identifier of a CSG cell under the HNB and a corresponding CSG ID; and
   determining by the HNB GW whether to allow the access of the UE according to the received target HNB information, comprising:
      matching by the HNB GW the received target HNB information with the access control information of the HNB stored by the HNB GW itself;
      determining by the HNB GW that the access of the UE is allowed if the identifier of the CSG cell, the CSG ID and the access mode information contained in the target HNB information match with those of the HNB stored by the HNB GW itself, otherwise determining by the HNB GW that the access of the UE is rejection;
   wherein the core network comprises a Mobility Management Entity (MME) and a Serving Gateway (SGW).

2. The method according to claim 1, before the core network acquires the target HNB information to determine whether to allow the access of the UE, the method further comprising:
   storing a White List of the UE by the core network.

3. The method according to claim 2, wherein the step that the core network determines whether to allow the access of the UE comprises:
   determining whether the CSG ID of the target HNB exists in the White List of the UE by the core network, if so, determining by the core network that the access of the UE is allowed, otherwise, determining by the core network that the access of the UE is rejected.

4. The method according to claim 1, wherein
sending the target HNB information to the core network by a source net element via a UE handover required message;
the source net element includes at least one of: a common base station, an HNB, an HNB GW and a radio network controller.

5. The method according to claim 4, wherein
informing the core network of the target HNB information by the source net element according to a measurement report reported by the UE.

6. The method according to claim 5, after the HNB GW determines to allow the access of the UE according to the received target HNB information, the method further comprising:
   sending a UE handover required message to the target HNB to perform a cell access flow of the UE.

7. A system for controlling network access during Home Node B (HNB) handover in a Long Term Evolution (LTE) system, comprising: a core network and a Home Node B Gateway (HNB GW), wherein
   the core network is used for acquiring target HNB information to determine whether to allow access of User Equipment (UE), and sending the target HNB information to the HNB GW to which the target HNB belongs if the access of the UE is allowed and the target HNB is connected with the core network via the HNB GW, wherein the core network comprises a Mobility Management Entity (MME) and a Serving Gateway (SGW);
   the HNB GW is used for determining whether to allow the access of the UE according to the received target HNB information;
   wherein the target HNB information comprises one of:
      an identifier of a Closed Subscriber Group (CSG) cell under the target HNB,
      a Closed Subscriber Group Identification (CSG ID) of the target HNB, and
      access mode information of the target HNB,
   the HNB GW further comprises:
   a memory for storing access control information of an HNB, the access control information includes at least one of:
      access mode information of the HNB,
      an identifier of a CSG cell under the HNB and
      a corresponding CSG ID; and
   a processor for matching the target HNB information with the access control information of the HNB stored by the memory and determining that the access of the UE is allowed if the identifier of the CSG cell, the CSG ID and the access mode information contained in the target HNB information match with those of the HNB stored in the memory; otherwise, determining the access of the UE is rejected.

8. The system according to claim 7, further comprising:
a source net element for sending a UE handover required message which contains the target HNB information to the core network.

9. The system according to claim 8, wherein the source net element is further used for sending the UE handover required message to the core network according to a CSG cell handover measurement report of the UE.

* * * * *